(12) United States Patent
Kowalchuk

(10) Patent No.: US 7,373,890 B2
(45) Date of Patent: May 20, 2008

(54) VACUUM CONTROL FOR SEED PLANTER

(75) Inventor: Trevor Lawrence Kowalchuk, Saskatoon (CA)

(73) Assignee: CNH Canada, Ltd. (CA)

( * ) Notice: Subject to any disclaimer, the term of this patent is extended or adjusted under 35 U.S.C. 154(b) by 452 days.

(21) Appl. No.: 11/194,784

(22) Filed: Aug. 1, 2005

(65) Prior Publication Data

US 2007/0022928 A1  Feb. 1, 2007

(51) Int. Cl.
*A01C 7/00* (2006.01)
*A01C 9/00* (2006.01)

(52) U.S. Cl. .................. 111/175; 111/900; 111/921; 111/922

(58) Field of Classification Search ............ 111/170, 111/174–179, 182–185, 200, 900, 921, 922
See application file for complete search history.

(56) References Cited

U.S. PATENT DOCUMENTS

| 3,627,173 | A  | 12/1971 | Kerker |
| 4,280,419 | A  | 7/1981  | Fischer |
| 4,513,957 | A  | 4/1985  | Schaefer, Jr. |
| 5,265,547 | A  | 11/1993 | Daws |
| 5,606,767 | A  | 3/1997  | Crlenjak et al. |
| 5,940,926 | A  | 8/1999  | Inzinna et al. |
| 6,012,199 | A  | 1/2000  | Litomisky et al. |
| 6,308,646 | B1 | 10/2001 | Luxon |
| 6,505,569 | B1 | 1/2003  | Richard |
| 6,644,225 | B2 * | 11/2003 | Keaton .................. 111/175 |

* cited by examiner

*Primary Examiner*—Christopher J. Novosad
(74) *Attorney, Agent, or Firm*—Rebecca Henkel

(57) ABSTRACT

A seed planting unit provides a manifold connecting a vacuum to multiple metering disks. The manifold includes valves to sequentially connect the manifold branches to the seed unit so as to moderate the peak air flow necessary to be handled by the vacuum source reducing horsepower drain and cost of the vacuum source itself.

19 Claims, 2 Drawing Sheets

VACUUM CONTROL FOR SEED PLANTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to seed planters for dispensing individual seeds at a controlled rate into a seed furrow, and specifically to seed planters that employ vacuum systems for metering the seeds.

Seed planters dispense seeds at a controlled rate into a seed furrow as a planter is advanced along the ground. In a typical arrangement, a tractor is coupled to tow a tool bar to which is attached, in a parallel spaced part relationship, a plurality of planting units.

Each planting unit typically includes a seed hopper holding seeds and communicating with a seed meter for dispensing seeds at a controlled rate as the planting unit moves over the ground. The planting unit may include on its lower surface a furrow opening disk for opening a furrow for the seeds, a furrow closing disk for closing the furrow about the seeds, and a trailing wheel that tamps down the earth about the furrow.

The seed metering unit must pick individual seeds from the hopper and deliver them between the furrow opening disk and the furrow closing disk at a controlled rate. One method of accomplishing this task with seeds of different sizes and shapes uses a disk with a plurality of openings that rotates past a seed chamber. A vacuum draws air through the openings in the disk to trap individual seeds within each opening for delivery into a second location for release.

The vacuum for the seed metering device may be provided, for example, by a blower driven by an hydraulic motor attached to the hydraulic system of the tractor. The motor is sized to provide a sufficient vacuum pressure at an air flow rate that might be anticipated when each disk for each planting unit is empty of seeds, and therefore under a condition of minimum back resistance to the blower. After seeds begin to fill the holes, a lower flow rate is required.

BRIEF SUMMARY OF THE INVENTION

Some embodiments include a vacuum manifold for a seed planter comprising a series of seed planting units receiving vacuum to pull seeds into pockets within a metering plate, a vacuum source, a manifold attached to the vacuum source to distribute a vacuum to the series of seed planting units through multiple manifold branches, at least a first valve within a manifold branch and an actuator communicating with the first valve to delay opening of the manifold branch with respect to at least one other manifold branch during initial stages of establishing a vacuum in the manifold.

In some cases the actuator is a vacuum sensitive actuator communicating with the manifold to actuate the first valve only after a predetermined vacuum level is achieved in the manifold. In some cases the first actuator is a piston movable within a cylinder. In some cases the manifold further includes a spring biasing the valve closed in an absence of a vacuum applied to the cylinder.

In some cases the actuator provides a continuous opening of the valve as a function of the manifold pressure. In some embodiments the actuator includes a timer delaying a predetermined time after starting of the vacuum source to infer the predetermined vacuum level. In some cases the manifold includes a second valve within a second manifold branch coordinating with the first valve to delay opening of a second manifold branch with respect to the opening of the first manifold branch.

In some cases the second valve has a second actuator coordinated opening the second valve. In some cases the first and second actuators are pistons within cylinders receiving vacuum lines and wherein the second actuator receives a vacuum line through a pressure switch communicating with a vacuum line of the first actuator, the pressure switch being closed until a predetermined pressure is reached and then opening. In some cases the second valve is driven by the actuator through a linkage connecting the first actuator to the first and second valves. In some cases the linkage is a cam plate rotated by the first actuator and driving cam follower on the first and second valves.

Other embodiments include a method of planting seeds comprising the steps of (a) providing a series of seed planting units having a metering plate including a series of pockets for receiving seeds, (b) attaching the seed planting units to a manifold communicating with a vacuum source and having multiple manifold branches connected with different seed planting units and including at least one valve in one manifold passage and (c) controlling the valve to sequentially applying a vacuum source to groups of the seed planting units to draw seeds into the series of pockets upon starting of a planting operation to limit a maximum air flow to the vacuum source.

In some cases each group is a single seed planting unit. In some cases the step of sequentially applying the vacuum source to groups of the seed planting units controls the valve according to a vacuum level in the manifold. In some cases the valve closes the manifold passage in an absence of a vacuum in the manifold. In some embodiments the valve provides continuously variable restriction of the manifold passage. In some embodiments the valve closes a predetermined time after starting of the vacuum source to infer the predetermined vacuum level in the manifold. In some embodiments the vacuum is sequentially applied through greater than two manifold passages.

In some cases each of the valves is sequenced by variations of vacuum sensed within at least one portion of the manifold. In some cases at least one of the valves is sequenced by a timer.

DETAILED DESCRIPTION OF THE PREFERRED EMBODIMENT

Figure 1:
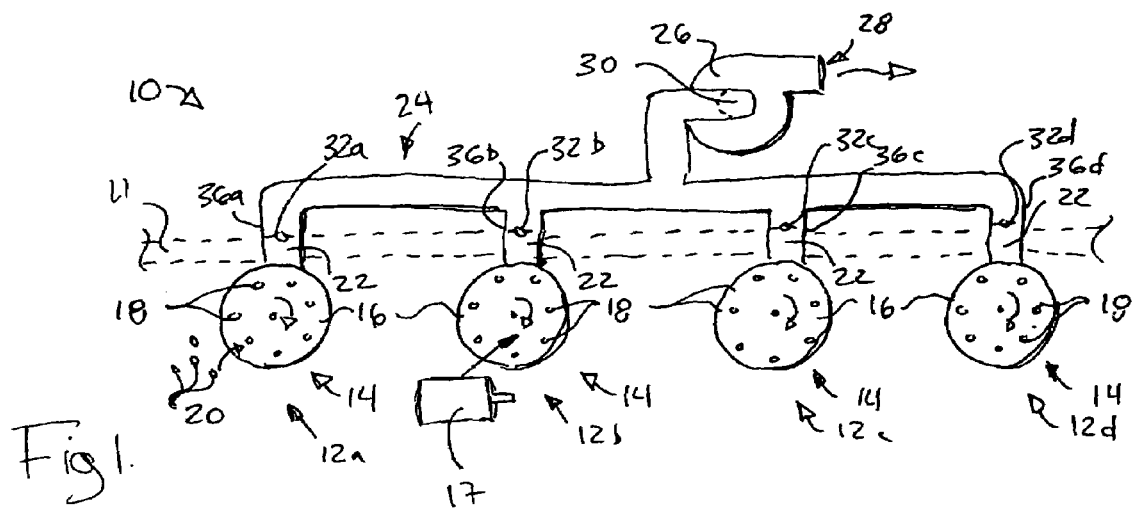
FIG. 1 is a simplified schematic view of a planting system receiving vacuum lines from a manifold driven by a single vacuum source.

Referring now to FIG. 1, a planting system 10 suitable for use with the present invention may provide for a number of planting units 12a through 12d arrayed along a toolbar 11 towed by a tractor or the like.

Each planting unit 12 may include a seed metering unit 14 including a rotating metering disk 16 driven by a drive 17 (e.g., a motor) having a series of circumferentially displaced orifices 18 that may receive seeds 20 drawn into the orifice by a vacuum applied to the opposite side of metering disk 16. Metering systems of this type are described in U.S. Pat. No. 6,564,730 assigned to the same assignee as the present invention and hereby incorporated by reference.

Each of the seed metering units 14 connects via a vacuum line 22 to a manifold 24 connected with one or more vacuum sources 26. The vacuum sources 26 provide for a discharge of air through a discharge outlet 28 and an application of a vacuum through an inlet 30 to manifold 24. Generally, the amount of air discharged from discharge outlet 28, and thus the capacity of the vacuum source 26, must be sufficient to create a negative pressure (henceforth vacuum pressure) to draw seeds 20 into the orifices 18 when the orifices are completely empty, for example, at the startup of the planting operation.

In the present invention, in order to reduce the peak air flow required of the vacuum sources 26, a series of valves 32a through 32d are provided located within corresponding branches 36 of the manifold 24 to control the air flow through individual vacuum lines 22. The valves 32 are rotating plate valves providing a continuous throttling of air flow as a function of rotation of the plates such as may allow smooth control reducing pressure shocks to the system such as may create control or seed retention problems.

Figures 2, 3:
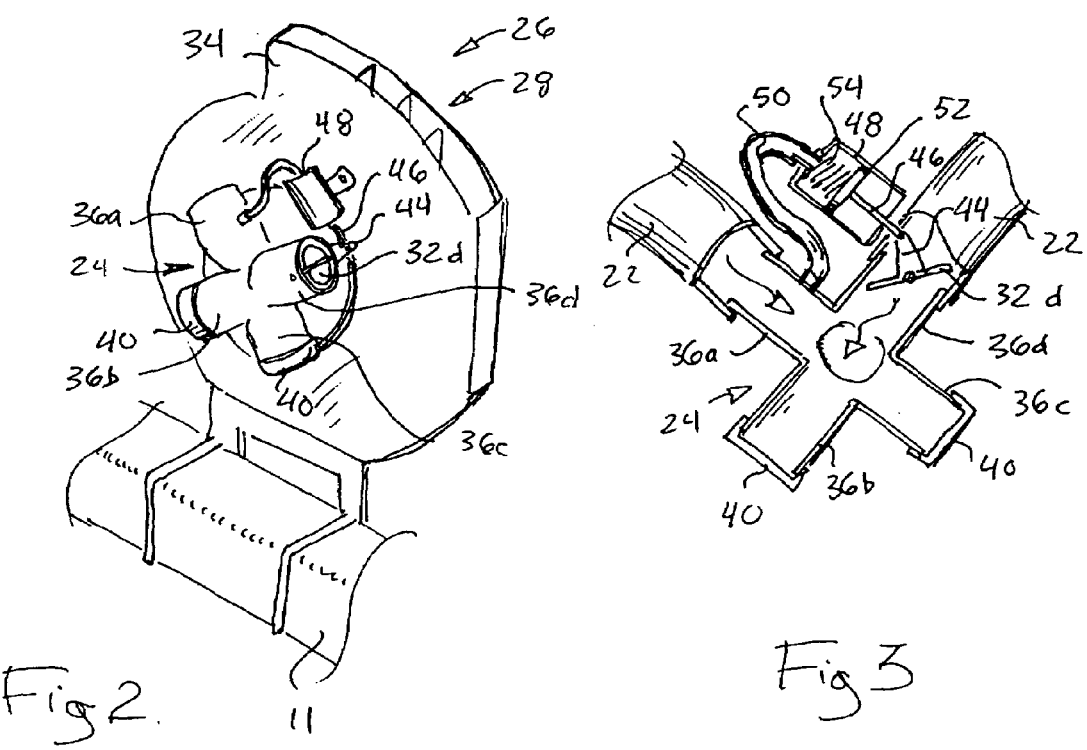
FIG. 2 is a perspective view of the vacuum source and manifold of FIG. 1 showing an actuator for sequencing air flow in two manifold branches.
FIG. 3 is an elevational cross-section of the manifold and actuator of FIG. 1 showing the connection of the actuator to an internal plate valve.

Referring now to FIG. 2, each vacuum source 26 may be a blower 34 powered by a hydraulic motor or the like (not shown) attached to the toolbar 11 to be easily attached to the planting units 12 through vacuum lines 22 formed of flexible hoses or the like. The vacuum source 26 may have a manifold 24 providing for four manifold branches 36 extending radially from a common center at 90 degree increments. In a first embodiment as shown in FIG. 2, two of the manifold branches 36b and 36c are capped with caps 40, and two of the manifold branches 36a and 36d are open to provide vacuum lines 22 to one or more planting units 12.

Referring now also to FIG. 3, a first open manifold branch 36a in this embodiment may have no valve 32 or that valve 32 may be fixed in an open position. The valve 32 in manifold branch 36d may be connected by an external actuator arm 44 to a piston shaft 46 of the vacuum cylinder 48. The cylinder 48 is attached with respect to manifold branch 36d so when actuated, it opens valve 32 in branch 36d.

A vacuum line 50 is connected to the vacuum cylinder 48 to decrease the pressure in a distal portion of the cylinder 48 removed from the piston shaft 46 when vacuum is applied to the vacuum line 50. This negative pressure draws a piston 52 within the vacuum cylinder toward that distal portion and opens valve 32. Conversely, loss of the vacuum in line 50 causes a return of the piston 52 toward the valve 32 under the influence of a contained spring 54 closing the valve 32. The spring 54 provides a system that automatically resets upon loss of vacuum.

The vacuum line 50 may be connected to manifold branch 36a or other convenient location of the manifold 24 so as to allow the piston 52 to be responsive to a predetermined pressure within the manifold 24 to open valve 32. Thus, upon initial startup, the pressure in the manifold 24 will be low as seeds are drawn into a metering disk 16 associated with branch 36a or multiple metering disks. As those metering disks fill up, the vacuum pressure within manifold 24 decreases causing actuation of the cylinder 48 and opening of valve 32. At this point, a sufficient number of seeds have blocked the orifices of disks attached to manifold branch 36a so that the opening of valve 32 will not unduly decrease the vacuum pressure within the manifold 24. Note that the operation of cylinder 48 is to gradually open valve 32 as the pressure in manifold 24 decreases so as to bring other planting units 12a online as soon as practical as pressure capacity warrants.

By sequentially engaging the vacuum lines 22 of each planting unit 14, the peak airflow of the vacuum source is reduced, reducing the necessary size of the motor or the hydraulic power required or reducing the number or size of blowers. In this approach where vacuum in the manifold is sensed, the system may actively respond to periods of vacuum loss for whatever reason and rapidly reengages the planting units when vacuum is obtained.

Figure 4:
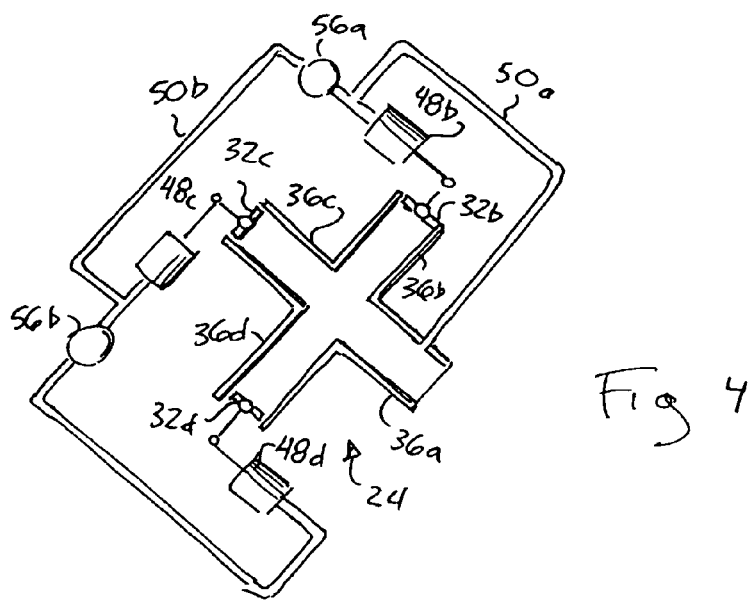
FIG. 4 is a simplified representation of the manifold of FIGS. 2 and 3 showing multiple actuators linked with vacuum lines for sequencing of four manifold branches.

Referring now to FIG. 4, the same approach may be extended to each of the branches 36a through 36d of an arbitrary manifold 24, and in this particular example, three additional branches. In this embodiment, manifold branch 36a has no valve, but a valve 32 and corresponding vacuum cylinder 48 may be associated with each of the branches 36b, 36c, and 36d operating generally as described above with respect to manifold branch 36d of FIG. 3. Branch 36a is connected by a vacuum line 50b to vacuum cylinder 48b and to a vacuum switch 56a associated with manifold branch 36b and valve 32b. Vacuum switch 56a is a snap action type valve that opens at a predetermined pressure difference.

The remaining orifice of vacuum switch 56a connects via vacuum line 50b to both vacuum cylinder 48c associated with manifold branch 36c and valve 32c and vacuum switch 56b.

The remaining port of vacuum switch 56b in turn connects to vacuum cylinder 48d associated with manifold branch 36d and valve 32d.

In operation, each of the valves 32b, 32c and 32d are initially closed under the influence of internal springs within cylinders 48b, 48c and 48d. As pressure decreases in the manifold 24, vacuum line 50a causes the actuation of vacuum cylinder 48b opening valve 32b. The actuation begins at a pressure lower than that which would trigger vacuum switch 56a. Once valve 32b is opened, the pressure begins to drop again as seeds are drawn into the corresponding holes in metering disk 16 blocking the holes until a pressure sufficient to open vacuum switch 56a is reached upon which vacuum cylinder 48c begins actuation. Vacuum switch 56a has a certain degree of hysteresis to accommodate a slight decrease in pressure at manifold 24 as valve 32c is opened.

After a period of time with valve 32c open, the seed metering disk 16 associated with the branch 36c begins to fill with seeds, and the pressure again decreases in manifold 24 until a second threshold is reached at which time vacuum switch 56b opens activating vacuum cylinder 48d to begin opening valve 32d.

In this way, each of the manifolds and/or associated seed metering units 14 may be sequentially brought online without overwhelming the vacuum source 26.

It will be recognized that vacuum cylinder 48 may alternatively be electric actuators such as solenoids or motors communicating with the manifold 24 via a pressure sensor of well-known type providing an electrical pressure signal that may be used to control the vacuum cylinder 48. Alternatively, a timer may be used to sequentially activate the valves 32 according to a predetermined time delay which approximates the time required to reach the pressures expected without a direct measurement of those pressures.

Figure 5:
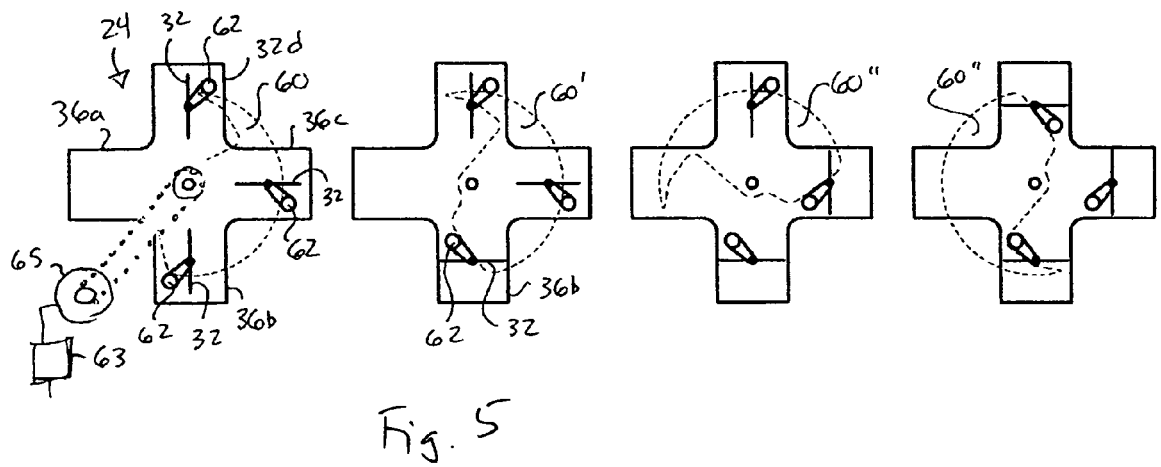
FIG. 5 shows four stages of operation of an alternative embodiment of the application of vacuum to four manifold branches.

Referring now to FIG. 5 in an alternative embodiment, a single actuator 65, in this case a motor, may be triggered by a timer 63 activated by an electrical signal associated with the starting of the planting system 10 or a vacuum gauge in the manifold 24 (not shown). The actuator 65 may rotate a cam 60 communicating with cam followers 62, serving in lieu of the actuator arm 44, where the cam followers 62 are spring biased or gravity biased against an outer surface of the cam 60. The cam 60 rotates about a center of the manifold 24 and has an outer surface that is a constant radius about the center of the manifold 24. As the actuator 65 rotates the cam 60 to a position shown by cam 60' the cam follower 62 associated with the valve 32b of branch 36b moves off of the constant radius cam surface allowing the valve 32 to close. Successive rotations to position shown by cam 60" and 60'" allow each of the valves 32 successively to close.

In normal field operation, each of the valves 32 will normally be fully opened.

It is specifically intended that the present invention not be limited to the embodiments and illustrations contained herein, but include modified forms of those embodiments including portions of the embodiments and combinations of elements of different embodiments as come within the scope of the following claims. For example, while FIGS. 1-5 above show a separate valve 32 associated with each seed meter 12a-12d, in at least some embodiments two, three, four or more seed meters may be downstream of each valve 32. Here, multiple seed meters would be connected to each port of the fan manifold.

In addition to the concepts described above, according to another inventive aspect, the seed meters can be controlled to effectively precharge all of the meters with seed and pressure prior to seeding activity. To this end, referring again to FIG. 1, if valves 32b, 32c and 32d are initially closed and valve 32a is opened to increase pressure in line 22 attached to meter 12a, if disc 16 continues to be rotated after seed fills holes 18 and pressure builds up therein and during the period when pressure is being built up in the other lines 22 linked to meters 12b-12d, meter 12a will drop seed to soil therebelow which will either be wasted or will result in non-uniform seeding (i.e., the row of seed corresponding to meter 12a will be longer than the row corresponding to meter 12b which will be longer than the row corresponding to meter 12c and so on).

To avoid this non-uniform seeding problem, in at least some embodiments, after seed is received in the holes 18 of a first disc and pressure builds up, as the valve (e.g. 32b) associated with the second seed meter 12b is opened, disc 16 corresponding to first meter 12a can be halted.

After seed is deposited in second disc holes 18 and pressure builds up, as the valve 32c associated with the third seed meter 12c is opened, disc 16 corresponding to second meter 12b can be halted. This process can be continued until pressure is built up in all lines 22 after which all of the meter discs 16 can be driven to rotate and begin seeding. Here, as all discs are precharged with seed and pressure, seed rows can be started at the same locations and seed is not wasted. This percharging concept is also applicable where multiple (e.g., 4) meters are downstream of each valve 32 where each bank of four meters can be rotated while pressure in lines associated therewith is increased and can be halted while other meters and associated lines are charged.

I claim:

1. A vacuum manifold for a seed planter comprising:
a series of seed planting units receiving vacuum to pull seeds into pockets within a metering plate;
a vacuum source;
a manifold attached to the vacuum source to distribute a vacuum to the series of seed planting units through multiple manifold branches;
a first valve within a manifold branch;
an actuator communicating with the first valve to delay opening of the manifold branch with respect to at least one other manifold branch during initial stages of establishing a vacuum in the manifold; and
a second valve within a second manifold branch coordinating with the first valve to delay opening of a second manifold branch with respect to the opening of the first manifold branch.

2. The vacuum manifold of claim 1 wherein the actuator is a vacuum sensitive actuator communicating with the manifold to actuate the first valve only after a predetermined vacuum level is achieved in the manifold.

3. The vacuum manifold of claim 2 wherein the first actuator is a piston movable within a cylinder.

4. The vacuum manifold of claim 3 further including a spring biasing the valve closed in an absence of a vacuum applied to the cylinder.

5. The vacuum manifold of claim 1 wherein the actuator provides a continuous opening of the valve as a function of the manifold pressure.

6. The vacuum manifold of claim 1 wherein the second valve has a second actuator coordinated opening the second valve.

7. The vacuum manifold of claim 6 wherein the first and second actuators are pistons within cylinders receiving vacuum lines and wherein the second actuator receives a vacuum line through a pressure switch communicating with a vacuum line of the first actuator, the pressure switch being closed until a predetermined pressure is reached and then opening.

8. The vacuum manifold of claim 1 wherein the second valve is driven by the actuator through a linkage connecting the first actuator to the first and second valves.

9. The vacuum manifold of claim 8 wherein the linkage is a cam plate rotated by the first actuator and driving cam follower on the first and second valves.

10. A vacuum manifold for a seed planter comprising:
a series of seed planting units receiving vacuum to pull seeds into pockets within a metering plate;
a vacuum source;
a manifold attached to the vacuum source to distribute a vacuum to the series of seed planting units through multiple manifold branches;
at least a first valve within a manifold branch;
an actuator communicating with the first valve to delay opening of the manifold branch with respect to at least one other manifold branch during initial stages of establishing a vacuum in the manifold; and
wherein the actuator includes a timer delaying a predetermined time after starting of the vacuum source to infer the predetermined vacuum level.

11. A method of planting seeds comprising the steps of:
(a) providing a series of seed planting units having a metering plate including a series of pockets for receiving seeds;

(b) attaching the seed planting units to a manifold communicating with a vacuum source and having multiple manifold branches connected with different seed planting units and including at least one valve in one manifold passage;

(c) controlling the valve for sequentially applying a vacuum source to groups of the seed planting units to draw seeds into the series of pockets upon starting of a planting operation to limit a maximum air flow to the vacuum source; and wherein at least one of the valves is sequenced by a timer.

12. The method of claim 11 wherein each group is a single seed planting unit.

13. The method of claim 11 wherein the step of sequentially applying the vacuum source to groups of the seed planting units controls the valve according to a vacuum level in the manifold.

14. The method of claim 13 wherein the valve closes the manifold passage in an absence of a vacuum in the manifold.

15. The method of claim 11 wherein the valve provides continuously variable restriction of the manifold passage.

16. The method of claim 11 wherein the valve closes a predetermined time after starting of the vacuum source to infer the predetermined vacuum level in the manifold.

17. The method of claim 11 wherein vacuum is sequentially applied through greater than two manifold passages.

18. The method of claim 11 wherein each of the valves is sequenced by variations of vacuum sensed within at least one portion of the manifold.

19. A method of planting seeds comprising the steps of:

(a) providing a series of seed planting units having a metering plate including a series of pockets for receiving seeds;

(b) attaching the seed planting units to a manifold communicating with a vacuum source and having multiple manifold branches connected with different seed planting units and including at least one valve in one manifold passage;

(c) controlling the valve to sequentially applying a vacuum source to groups of the seed planting units to draw seeds into the series of pockets upon starting of a planting operation to limit a maximum air flow to the vacuum source;

(d) providing separate drives for rotating the metering plates corresponding to each group of seed planting units; and (e) during a pre-charging period, as pressure is being built up in the manifold passage associated with a group, rotating the plates corresponding the group; and (f) after pressure is built up in the manifold passage associated with a group and during the pre-charging period, halting rotation of the plates associated with the group.

* * * * *